United States Patent [19]

Broos

[11] 4,369,439
[45] Jan. 18, 1983

[54] CURSOR POSITION CONTROLLER FOR A DISPLAY DEVICE

[75] Inventor: Michael S. Broos, Kittery, Me.

[73] Assignee: Massachusetts Institute of Technology, Cambridge, Mass.

[21] Appl. No.: 225,123

[22] Filed: Jan. 14, 1981

[51] Int. Cl.³ ............................................. G09G 1/00
[52] U.S. Cl. ................................... 340/710; 340/706
[58] Field of Search ............... 340/710, 706, 709, 711

[56] References Cited

U.S. PATENT DOCUMENTS

| | | | |
|---|---|---|---|
| 3,541,521 | 11/1970 | Koster | 364/521 |
| 3,541,541 | 11/1970 | Engelbart | 340/710 |
| 3,625,083 | 12/1971 | Bose | 74/471 XY |
| 3,643,148 | 2/1972 | Brown et al. | 318/628 |
| 3,668,685 | 6/1972 | Horvath | 340/710 |
| 3,835,464 | 9/1974 | Rider | 340/710 |
| 3,872,460 | 3/1975 | Fredrickson et al. | 340/711 |
| 3,883,861 | 5/1975 | Heartz | 340/705 |
| 3,892,963 | 7/1975 | Hawley et al. | 340/710 |
| 3,967,266 | 6/1976 | Roy | 340/709 |
| 3,987,685 | 10/1976 | Opocensky | 74/471 R |
| 4,085,443 | 4/1978 | Dubois et al. | 364/900 |
| 4,101,879 | 7/1978 | Kawaji et al. | 340/709 |
| 4,118,695 | 10/1978 | Ogawa et al. | 340/709 |

Primary Examiner—Marshall M. Curtis
Attorney, Agent, or Firm—Arthur A. Smith, Jr.

[57] ABSTRACT

A position indicator or cursor is moved over a visual display in response to signals generated by corresponding movement of a keyboard relative to a fixed point on the surface supporting the keyboard.

6 Claims, 3 Drawing Figures

CURSOR POSITION CONTROLLER FOR A DISPLAY DEVICE

BACKGROUND OF THE INVENTION

In many general-purpose computer systems and in most commercial "word-processing" or document creation systems, the editing of textual data is performed by a human operator, using a typewriter-style keyboard to enter editing commands and data, and viewing the edited text on a CRT display. The computer maintains a "current position" in the text being edited, which most editing commands imply as an argument. For example, if the operator presses the "rubout" key, it is interpreted by the computer as a command to remove the character to the left of the current position from the text being edited and from the display of that text being viewed by the operator. The computer normally indicates the current editing position by displaying a distinctive marker, called the cursor, on the CRT along with the text being edited.

The operator controls the position of the cursor in a variety of ways. In the majority of such systems, a particular keystroke or combination of keystrokes is interpreted by the computer as a command to move the cursor to the right, left, up, or down in increments of a single character or, in some systems, an entire word, line or paragraph. In many systems, special keys are devoted to these functions and are usually located in a special keypad separate from and often adjacent to the typewriter keypad.

A smaller number of editing systems use a position-indicating device whose position is sensed by the computer and used to control the cursor position in the display and text being edited. Examples of such devices are: light pens, tablet pens, joysticks, thumb wheels, and "mice" (devices which sit on a table top and are moved about by hand). Devices of this type are disclosed in U.S. Pat. No. 3,541,521 to Koster, U.S. Pat. No. 3,541,541 to Engelbart and U.S. Pat. No. 3,835,464 to Rider.

All of the aforementioned prior art position-indicating devices enable an operator to "point" at a position on the display where the cursor is to be located. However, the typical editing sequence is; (1) manually adjust a control to position the cursor at the place to be edited; and (2) enter one or more keystrokes to modify the text. This sequence is then repeated for the next editing operation. If the operator needs to stop typing to pick up a light pen, or grasp a "mouse" or like device or to use a special keypad to adjust the cursor position, and then to return to the typewriter keyboard for the editing operation, he or she uses a lot of time getting his or her hands repositioned over the "home" typing keys. Often, one of the operator's hands is incorrectly positioned, upon return to the keyboard. For example, the operator's hand may have drifted one key to the right or left of the correct position, and many typing errors result. Touch typists especially find this type of interaction annoying, which is probably why such systems have found little acceptance outside of the computer research field.

Accordingly, it is an object of the present invention to provide a system for facilitating the generation of two-dimensional coordinate data for input to an electronic digital computer to control the position of a visible marker, or "cursor", displayed on the face of a cathode ray tube or other dynamic display device under control of the computer.

It is another object of the present invention to provide such a system which may be operated in conjunction with a typewriter-style keyboard in a manner which does not require the operator to remove a hand from the keyboard.

These and other objects and features of the present invention will be understood from the description to follow, taken in conjunction with the accompanying drawings.

SUMMARY OF THE INVENTION

The present invention provides a system that includes a data entry keyboard mounted on a carriage which is freely movable on a support surface within a bounded horizontal plane. The carriage is mechanically constrained to movement within the bounded horizontal plane by a suitable barrier provided on the support surface. A sensor for detecting motion of the keyboard carriage relative to a fixed point within the bounded horizontal plane is mounted either on the keyboard carriage or is fixed within the support surface. The motion detected by the sensing element is translated into position signals representative of the coordinates (e.g. X and Y) of the keyboard's position within the bounded horizontal plane. These position signals are applied to a computer, which in turn generates a cursor at a corresponding position on a visual display. The cursor's position is automatically changed responsive to detected changes in the position of the keyboard carriage.

In the preferred embodiment two brakes independently operable by hand, are provided on the keyboard carriage. One brake, when applied, restricts the keyboard carriage to movement along an X axis within the bounded plane, while the other brake restricts the keyboard carriage to movement along a Y axis within the bounded plane.

In operation, in a data entry mode, a user may enter text data to the system using the keyboard or by alternate conventional means (e.g. magnetic disc, paper tape, OCR, or the like. In a text editing mode, the operator may re-position the keyboard and carriage by selectively operating the brakes and applying forces to the carriage in a manner positioning the cursor to the location of a desired text change. The operator may then enter the appropriate editing command as required by the text editing system.

The main difference between the apparatus of the present invention and those devices currently used for cursor control is that the present system uses the keyboard (coupled to the carriage) as a position indicating device. Accordingly, the main advantages of the present invention over the current devices and methods used for control of a cursor are: (1) the operator may selectively control the cursor position without removing his or her hands from the keyboard; and (2) the naturalness attributed to the "pointing" capabilities of a position indicating device is retained. The combination of these two qualities is the real advantage of the invention and is expected to make it possible to perform text editing tasks in a way which is much more natural and efficient than with conventional systems.

The present invention is useful in computer applications involving the editing of text displayed on a CRT or other display device, such as order-entry systems, word processing or document creation systems and pre-press text preparation systems for the publishing industry. The invention may also be utilized in the editing of non-textual data on display devices, such as graphs, line drawings, or telemetry data.

DESCRIPTION OF THE PREFERRED EMBODIMENTS

Figure 1:
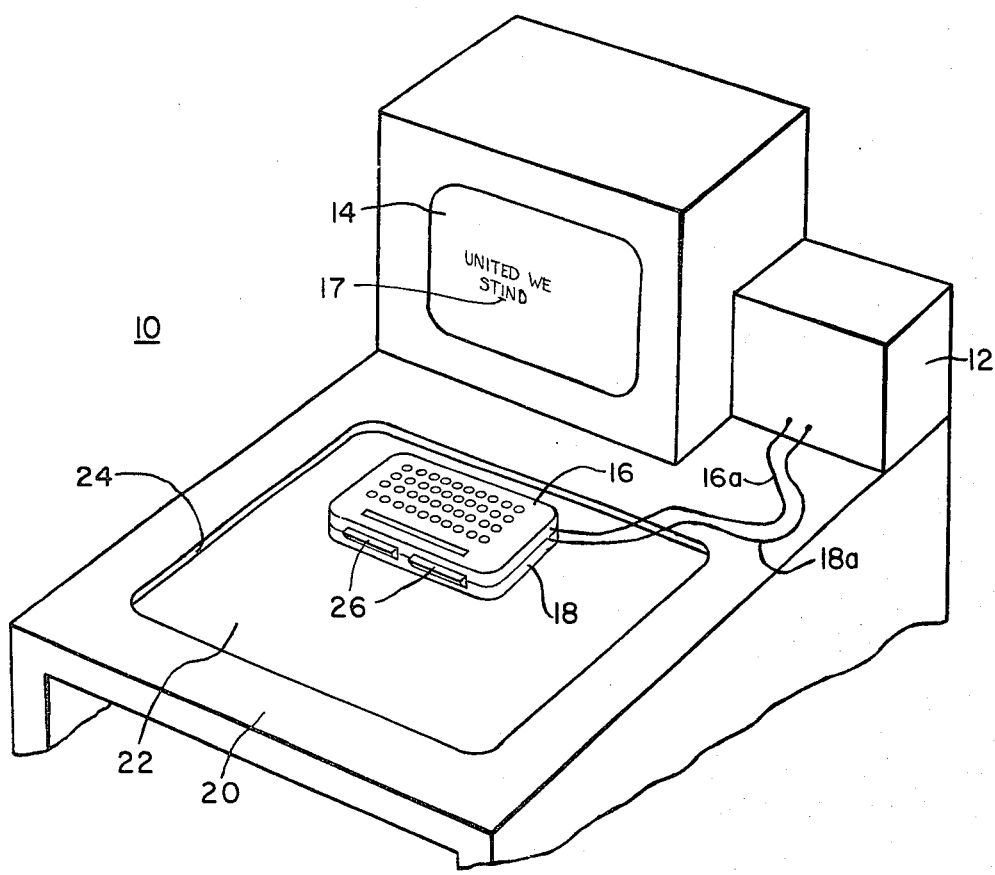
FIG. 1 is a pictorial illustration of a cursor positioning system in accordance with the invention.

FIG. 1 illustrates a cursor positioning system 10 for an information processing system constructed in accordance with the present invention. The system 10 includes a programmed digital computer 12 and associated cathode ray tube (CRT) display 14, and a data entry keyboard 16 mounted on a carriage 18.

The keyboard 16 is a conventional data entry keyboard having a plurality of selectively operable, pressure sensitive switches which provides data signals on an output line 16a representative of this state of the switches. Line 16a is coupled to the computer 12, as described below. In the present embodiment, the computer 12 and CRT display 14 generally have the form of a conventional word processing system such as the Model 8000 distributed by CPT Corporation of Minneapolis, Minn. In FIG. 1, the image on display 14 shows text with a cursor 17 identifying a text character for which an editing operation is desired.

Unlike conventional systems which generate cursor position signals in response to signals generated by the operation of switches on the keyboard, the present embodiment generates cursor position signals directly from the position transducers associated with carriage 18.

The carriage 18 is positioned on a table 20 and is movable in the horizontal plane of the table surface 22 bounded by walls 24. In the present embodiment, the carriage 18 includes selectively locking casters (not shown) positioned at each of the corners of the lower surface of the carriage, to permit selective free motion of the carriage on the surface 22. In the embodiment of FIG. 1, the bounded support surface 22 is shown as a depression in the top surface of table 20. Of course, the movement of carriage 18 about the support surface 22 may be mechanically constrained in an alternative manner, for example, by walls protruding from the surface of the table 20.

In the present embodiment, a pair of control bars 26 extend from the carriage 18 for controlling the operation of electromechanical brakes (not shown) which selectively lock and unlock the casters. In the present embodiment, the control bars 26 are positioned in a manner similar to the space bar of a conventional typewriter keyboard. With this configuration, the operator's palms may rest lightly on the upper surfaces of the bars 26 and 27 (which thus form palm pads). The palm pads provided by control bars 26 and 27 have a two axis concave upper surface so that when the operator's palms are resting thereon, a transverse motion of either of the operator's palm transmits a force in either the X or Y or both directions (depending upon the direction of the force of the operator's palms) to the carriage assembly 18. In the present embodiment, with little or no operator applied downward force on either of bars 26, the casters remain locked and the position of carriage 18 is fixed on surface 22. However, in response to a downward force on either of bars 26 and 27, a force sensor in bars 26 and 27 generates a signal which releases the caster brakes so that the carriage may be freely moved about surface 22 in response to horizontal forces applied by the operator to the palm pad of either bars 26 and 27. In other embodiments, the carriage 18 may alternatively be constrained to movement on either an X or Y or both axes by selective operation of electromechanical brakes associated with respective ones of bars 26 and 27.

The carriage 18 further includes a position transducer 28 which cooperatively interacts with the top surface 22 of table 20 and provides position signals on signal lines 18a indicative of changes in position of the carriage 18 from an initial starting point within the walls 24. Thus in the present embodiment, the transducer signals are incremental, representing changes in position from a calibrated reference position. In other embodiments, those signals may be in absolute form.

Figure 2:
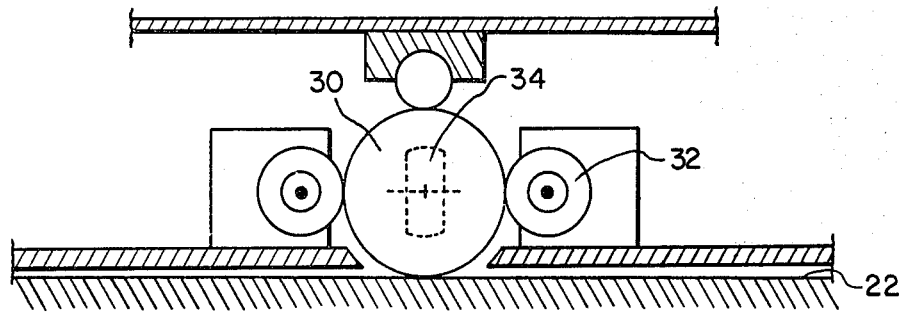
FIG. 2 is a partial elevational view, in cross-section, showing a motion sensor mounted within a keyboard carriage in accordance with the invention.

By way of example, this transducer assembly 28 may have the form shown in FIG. 2 which shows a sectional view of such an assembly having a spherical member 30 positioned within the carriage 18 which protrudes below the lower surface 31 of carriage 18 in a manner so that it is in constant frictional contact with the support surface 22. The spherical member 30 is adapted to rotate as the carriage 18 is moved about the surface 22. A pair of conventional rotary encoders 32 and 34 with friction driven input wheels are coupled to the spherical member 30 at 90° separated points on the surface of member 30 in a plane parallel to the surface 22 and passing through the center of the spherical member 30. With this configuration, as the carriage 18 is moved about the surface 22, the rotation of spherical member 30 is detected by the position transducers 32 and 34, which in turn provide X and Y position change signals on signal lines 18a, which in turn are applied to the computer 12 (which generates digital signals representative of the X and Y coordinates changes of the position of the carriage 18). In alternate forms of the invention, the position transducers may have other forms, such as optical detectors which detect motion of the carriage relative to a set of bars (or grid lines) on surface 22.

In alternative embodiments, the spherical member 30 may be positioned within the table 22 and protrude from that surface to be in frictional contact with the lower surface 31 of the carriage 18. In a similar manner, the transducer 28 provides signals representative of the changes in carriage position in response to motion of the carriage 18 with respect to the surface 22. In this latter form, the dimensions of the bottom of the carriage 18 and those of the support surface 22 ensure that the spherical member 30 mounted beneath the support surface 22 is always covered by the bottom of the carriage 18 during its movement about the support surface 22.

Figure 3:
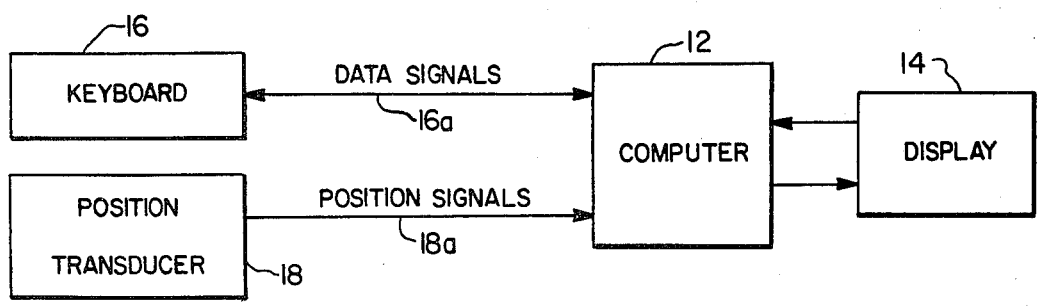
FIG. 3 is a simplified block diagram of the system of the invention.

FIG. 3 illustrates the system processing of the digital carriage position signals generated by position transducers 32 and 34. These signals are transferred from the transducers of carriage 18 (or in an alternative embodiment from the transducers of the table 20) to the computer 12 by signal line 18a and an interface internal to the computer 12.

In the present embodiment, the computer 12 and a CRT display 14 generally have the form of a conventional word processing system, such as the Model 8000 distributed by CPT Corporation of Minneapolis, Minn. However, unlike that conventional system which generates cursor position signals in response to signals generated by the operation of switches on the keyboard, the present embodiment generates cursor position signals directly from the position transducers provided on lines 18a. As a result, the operator may manually position the keyboard 16 by way of its carriage 18 to a point within the bounds of walls 24. In keeping with this motion, the cursor is positioned correspondingly throughout the field of view of the CRT display 14. The operator may then perform word processing operations in the normal manner for the word processing system.

In practical configurations, the present invention requires relatively little motion of the keyboard while in order to provide full travel of the cursor across the screen of display 14 (it is desirable to keep this motion within a few inches or less). At the same time, the ratio of the distance moved by the keyboard 16 and the corresponding distance the cursor moves should be kept as large as possible. In order to effect accurate positioning of the cursor even when relatively small movements of the keyboard produce proportionately large movements of the cursor, the computer 12 may be readily configured to restrain cursor position on the screen of display 14 to be in the nearest one of a plurality of discrete elemental areas within the image, such as the areas occupied by characters within that image.

The invention may be embodied in other specific forms without departing from the spirit or essential characteristics thereof. For example, the system of the present invention may alternatively be configured in a manner where the keyboard does not move, but rather the palm pads from the control bars 26 and 27 would include a plurality of force sensors adapted to detect horizontal orthogonal forces applied by an operator. The sensors would operate so that forces applied by the operator's palm would be detected and would sense the magnitude and direction of those horizontal forces and translate those detected forces into motion of the cursor in the display 14. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A system for controlling the display of data for a visual data display controlled by a computer, wherein said system comprises:
   an operator controlled keyboard for selectively generating said display data alteration signals;
   a support surface for said keyboard;
   means for supporting said keyboard on said support surface whereby said keyboard is movable by said generator;
   constraining means for limiting the movement of said keyboard on said support surface whereby each elemental area in the allowed region of movement of said keyboard corresponds to an elemental area of said display,
   means for generating said position signals representative of the position of said keyboard relative to a fixed reference point on said support surface, and
   means for altering the data displayed at the points in said display defined by said position signals, said position signals being indicative of the positions on said display of portions of said data to be altered, and in accordance with display data alteration signals indicating the nature of the change to be made at the indicated position.

2. The system of claim 1 wherein said means for generating said position signals is attached to said keyboard for movement therewith and includes rotatable contact means for frictionally contacting said support surface and transducer means for translating the rotational motion of said contact means into coordinate position signals corresponding to said position signals.

3. The system of claim 1 wherein said means for generating said position signals includes rotable contact means mounted in said support surface for frictional contact with said keyboard, and includes transducer means for translating the rotational motion of said contact means into coordinate position signals corresponding to said position signals.

4. An information processing system comprising:
   A. display means for displaying a data field representative of stored data,
   B. keyboard and associated carriage means adapted for translational movement under control of an operator in a region corresponding to said data field,
   C. transducer means for generating a position signal representative of the location of said keyboard with respect to a reference point in said region,
   D. means responsive to said position signal for identifying a location in said stored data corresponding to said location of said keyboard in said region,
   wherein said display means is responsive to said identifying means to display a cursor at the point in said displayed data field corresponding to the location of said keyboard.

5. A system according to claim 4
   wherein said carriage means includes a selectively operable brake system, said carriage means being fixed with respect to said reference point when said brake system is operative in response to a lock signal and being freely movable when said brake system is operative in response to an unlock signal, and
   wherein said carriage means further includes at least one palm rest having a force sensor, said force sensor being responsive to a predetermined force selectively applied by an operator's palm to generate said unlock signal, and to generate said lock signal otherwise.

6. An information processing system comprising:
   A. display means for displaying a data field representative of stored data, and for displaying a cursor,
   B. keyboard including a palm rest transducer means for generating a position signal representative of the magnitude and direction of horizontal forces applied to said transducer means by an operator's palm,
   C. means for controlling the position of said cursor in response to said position signal.

* * * * *